Figure 1:
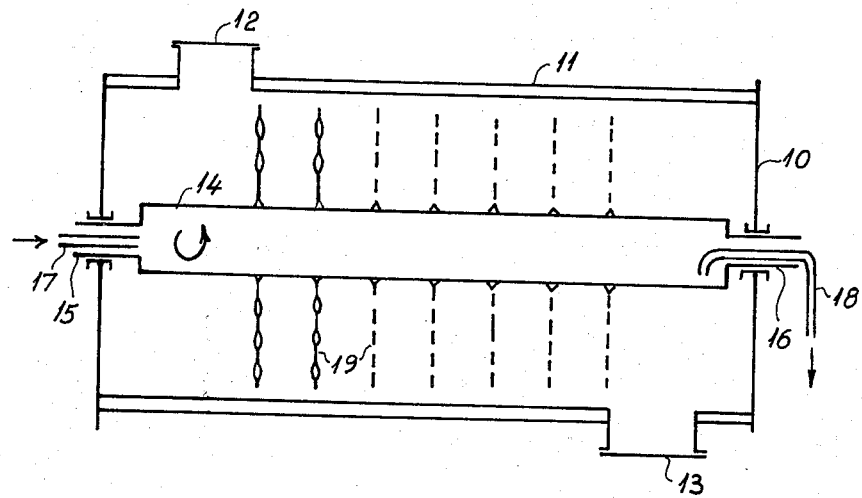

United States Patent [19]
Hovad

[11] 3,923,097
[45] Dec. 2, 1975

[54] HEAT EXCHANGER

[75] Inventor: Helge Hovad, Bagsvaerd, Denmark

[73] Assignee: A/S Atlas, Ballerup, Denmark

[22] Filed: Apr. 26, 1974

[21] Appl. No.: 464,642

[30] Foreign Application Priority Data
May 1, 1973 Denmark............................ 2352/73

[52] U.S. Cl. .................... 165/92; 34/124; 34/179; 34/183
[51] Int. Cl.² ........................................ F28G 17/00
[58] Field of Search .............. 34/108, 109, 179–182, 34/134, 138, 139; 165/87, 88, 89, 92

[56] References Cited
UNITED STATES PATENTS

| | | | |
|---|---|---|---|
| 230,976 | 8/1880 | Weiss................................... | 165/92 |
| 3,486,740 | 12/1969 | Christian............................. | 165/92 |
| 3,777,810 | 12/1973 | Philips ................................. | 34/124 |
| 3,800,865 | 4/1974 | Onarheim et al..................... | 34/183 |

FOREIGN PATENTS OR APPLICATIONS

| | | | |
|---|---|---|---|
| 952,099 | 11/1964 | United Kingdom................... | 165/92 |

*Primary Examiner*—Kenneth W. Sprague
*Assistant Examiner*—James C. Yeung
*Attorney, Agent, or Firm*—Harold L. Stowell

[57] ABSTRACT

A heat exchanger for indirect heating or cooling of moist, tacky material is described, comprising a stationary drum with an internal hollow shaft or rotor with means for circulating heating or cooling medium, said rotor being encircled by annular bodies in the shape of ribs with a helical, hollow space, the inner end of which communicates with the interior of the rotor, the outer end being closed.

7 Claims, 6 Drawing Figures

HEAT EXCHANGER

This invention relates to an apparatus in the shape of a heat exchanger for indirect heating, drying or cooling of moist tacky material, said apparatus being of the kind having a stationary drum with a revolving hollow shaft or rotor with an inlet for a drying medium and an outlet for the same or a condensate thereof, the rotor carrying annular bodies with cavities connected to the hollow space of the rotor.

An apparatus of the said kind will specifically be useful in the drying of fishmeal, offal from slaughterhouses, mash from breweries, and the like tacky material of animal or vegetable origin.

Formerly, materials of the said kind were dried by means of direct fired air driers, but since the materials are often heat sensible and inflammable when dried, driers of this kind have been abandoned in favour of driers with indirect heating.

Thus, drum driers with longitudinal pipes have been used, wherein the drum and the pipes rotate together or, as according to the Norwegian Pat. No. 62.174, the drums are stationary being fitted with also stationary heating pipes coiled in planes perpendicular to the drum axis, and with rotating stirring members mounted upon a central shaft, and moving between the coils. In another embodiment according to the same patent, the heating pipes are helically coiled and mounted upon a rotating hollow shaft.

These apparatus types are not suited for drying of tacky materials, because their effectivity is rapidly decreased owing to the material forming deposits on the pipes, which are removed only with difficulty, and because the materials, if heat sensible, will be damaged, unless the temperature of the heating medium is limited to values below the scorching temperature of the material in question. The deposits will also often be of poor heat conductivity.

In the Norwegian Pat. No. 95.490, therefore, a dryer has been proposed, having a stationary drum enclosing a hollow rotor encircled by hollow annular bodies of triangular cross section, so that only smooth surfaces come into contact with the material to be dried. Possible deposits on such smooth surfaces are relatively easily detached during the movement of the surfaces in the material to be dried, even as the possibility exists of providing stationary reamers.

The said design has various disadvantages. Thus, smooth surfaces as those of the said annular bodies are not very resistant to pressure, and because pressurized steam is generally used as a heating medium, the bodies have either to be made from heavy sheet material, which involves weight problems, or, as is usual in the apparatuses used in practise, stays have to be welded in between the two frustoconical sheets making up one such annular body. This welding of stays is difficult to mechanize and since as many as 90 stays are used in each body, this contrivance is very costly.

Further, the cross-sectionally triangular design of the annular bodies makes them bulky so that only a limited number of bodies can find room on the hollow rotor, and the effective space for reception of the material to be dried is reduced.

The object of the invention is to provide a dryer substantially relieving the said disadvantages, being constructionally so designed that the manufacture thereof can be largely mechanized and automatically carried through.

With this object in view, the characteristic feature of the drier of the invention is that the annular bodies encircling the rotor are designed as ribs with a helical hollow space, the inner end of which is in connection with the interior of the rotor, the outer end near the circumference of the rib being closed.

This design is based upon the recognition that the heat transmission number between heating surface and drying goods for the materials dealt with here is so low, 20–60 kcal/m²hC°, that a fin or rib design as stated hereinbefore, where only part of the surface is directly heated, is effective. Owing to the small cross-sectional area of the heating coil and its confinement within curved surfaces, it will endure a relatively high pressure of the heating medium without any need for additional bracing. Since the heating coil is preferably of lenticular cross-section, the thickness of the individual annular body is small, and this, and the reduced weight on account of the reduced consumption of rib material, has the effect that additional annular bodies can find room upon the hollow rotor without overloading the latter and without reducing the available space for material to be dried too much. At the same time, the advantage of having smooth surfaces in contact with the material to be dried, and the possibility of using stationary reamers as in the hereinbefore described known design, is retained.

In an embodiment of the drying apparatus according to the invention the individual ribs have been manufactured from plane sheets, and the helical hollow space has been formed by attachment to the sheet of a helically cut strip of arcuate cross-section, possibly a strip made from a coiled tube being cut into halves along an axial plane. Besides, the space between individual turns of the coil can be reduced to a minimum by forming the strip used for making the helical hollow space from a sheet, in which only a single helical cut is made. The distance between the individual turns will then correspond to the reduction in width resulting from the curving of the strip plus the width of the coil, and you get the largest possible area of the rib, which is in direct contact with the heating medium.

To increase the heat transmission, the above described embodiment may be changed so that the outer end of the helical hollow space according to the invention is connected with a radially extending return passage to the hollow space of the rotor through an opening in the plane rib sheet. In this way, the flow rate of the heat medium can be increased, resulting in a larger heat transmission.

The heat transmission can be further increased in another embodiment according to the invention, by a helical strip of curved cross-section being mounted on each side of the plane sheet from which the rib is made.

In the latter embodiment according to the invention the outer ends of the helical, hollow spaces can overlap one another and be mutually connected through an opening in the rib sheet.

The stiffness of the rib sheet, and the capacity of withstanding internal pressure can be increased in a further embodiment according to the invention, by embossing or calandering a helical bulb in the sheet, from which the rib is made, said bulb being covered by a helically cut, and also embossed strip to form the helical hollow space.

In cases, where no direct flow of the heating medium through the helical hollow spaces is possible, and when the heat medium is a vapour which is condensed, a problem may arise in getting the condensate and possible air contained in the vapour returned to the hollow rotor in counter-current to the vapour flow. In an embodiment of the drier according to the invention, this problem is solved by the provision in the helical hollow space of a more or less tight-fitting guide plate consisting of a correspondingly helical strip terminating shortly before the closed outer end of the hollow space.

This strip is only tightly fastened in part to allow the condensate to pass between the strip and the inner side of the heating coil. The condensate will mainly be collected in the outer hollow space, where it is concurrent to the vapour. In this manner, the condensate and the air is more easily chased out of the heating coil. The direction of rotation is preferably chosen so that the condensate is screwed towards the shaft.

Instead of a strip, a tube may be used, which is inserted in the hollow space of the heating coil. By means of this tube, the heating medium may be led forward to the outer end of the heating spiral.

Finally, an embodiment of the dryer may advantageously be designed so that the distance between the turns of the helical hollow space is adjusted so that helically cut strips can be used for forming the hollow spaces, said strips being substantially of a width corresponding to the distance between the turns of these helical strips. Thus, a saving of material is gained, since two interlocking helical strips may be cut from one and the same sheet.

Common to all of the above embodiments is that the construction work, consisting mainly in sheet cutting and welding, is well suited for automatizing owing to the long cuts and continuous welding seems. Further, the design of the fins or ribs results in a good utilization of the construction material, allowing for use of a more costly material, e.g. rustproof steel.

Figure 2:
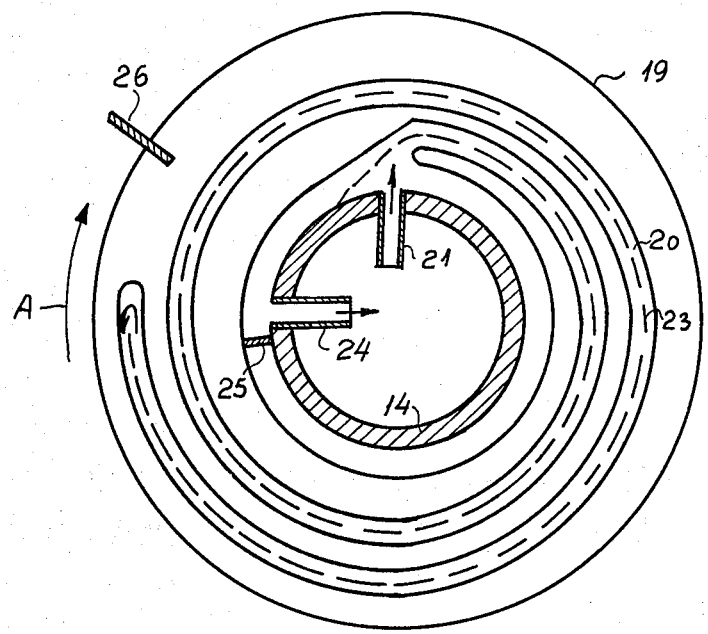
Figure 3:
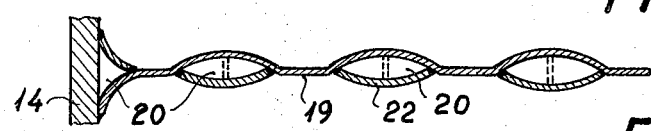
Figure 4:
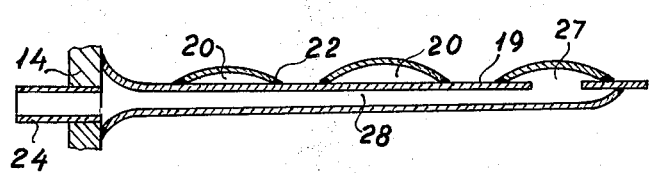
Figure 5:
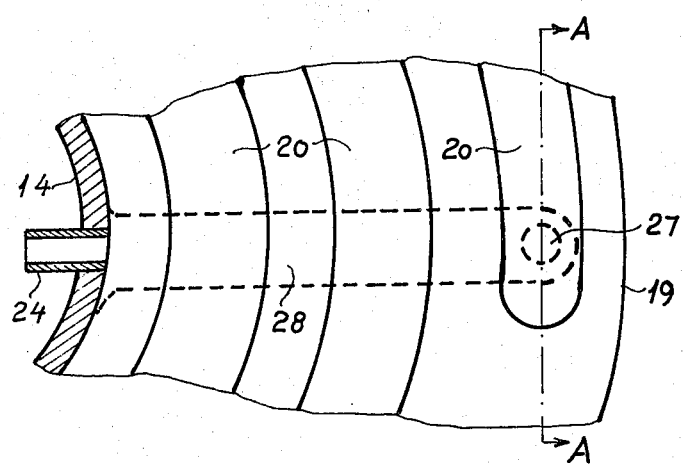
Figure 6:
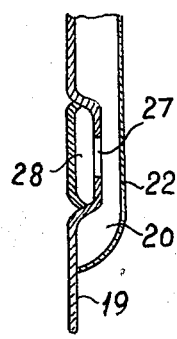

Some embodiments of the drier according to the invention will be described more detailed in the following having reference to the accompanying drawings, in which:

FIG. 1 schematically shows a longitudinal section of the drier,

FIG. 2 on a larger scale an elevation of a rib on the hollow rotor of the apparatus, said rotor being seen in cross-section, FIG. 3 a radial section through a rib, FIG. 4 a radial section through another embodiment of a rib, FIG. 5 an elevation of part of a rib as shown in FIG. 4, and FIG. 6 a section along the line A—A in FIG. 5.

The drier schematically shown in FIG. 1 consists of a stationary drum 10, having a heating jacket 11 around its cylindrical part, an inlet 12 for the material to be dried, and an outlet 13, which is here placed at the bottom, but may also be placed some way up the side of the drum.

Within the drum 10 and coaxially with it is pivotally mounted a rotor 14 having hollow axle-necks 15 and 16.

Through the axle-neck 15 passes a supply pipe 17 for the heating medium, here supposed to be steam, and through the axle-neck 16 a siphon pipe 18 is inserted for draining off condensate, respectively heating medium, if the latter does not condensate.

The rotor 14 is fitted with ribs 19 having a smooth, but not plane exterior.

The said ribs may be of the design shown in elevation in FIG. 2 and in cross-section in FIG. 3 as having a helical duct 20 for the heating medium, said duct being connected at its inner end with the hollow space of the rotor 14 through a length of pipe 21.

Preferably, the duct 20 is of lenticular or spindle-shaped cross-section in the outer turns, see FIG. 3, whereas the turn adjacent the rotor is of substantially triangular cross-section with a generatrix for the rotor wall as base.

In this case, the rib 19 has been cut from a plane metal sheet, after which a substantially helical bulb has been embossed or calandered into the sheet, and the resulting depression is covered with a strip 22, which has been helically cut out and embossed to an arcuate cross-section, said strip being welded on to form the duct 20.

As suggested by the broken line, the duct 20 may be longitudinally divided almost onto the closed end by means of a coiled strip 23 being part-welded along one or both borders to the middle of the passage 20. As appears from FIG. 2, the strip 23 extends to contact with, and is possibly fixed onto the exterior of the rotor 14 behind the supply pipe 21 for the heating medium. Thus, the medium is forced to first flow on to the extreme end of the duct 20 through that part of the said duct being closer to the rotor. It can then pass around the end of the partition formed by the strip 23 and return through the other part of the duct 20. Possibly formed condensate will thus be driven forward by the heating medium and more easily returns to the hollow space of the rotor, from where it can be removed through the siphon pipe 18. More important is, however, that possibly separated air is also carried along and does not become stationary to form air pockets inhibiting or stopping the heating medium from entering the duct 20.

Condensate and air are returned to the rotor through a pipe 24. Just behind said pipe, a closed partition 25 is provided.

At the circumference of some or all of the ribs 19, shovels 26 (FIG. 2) may be mounted crosswise to aid in moving the material to be dried forward towards the outlet 13.

If the partition 23 is omitted, the rotation of the rotor should be in such direction that the closed end of the duct 20 is in front so that the movement of the condensate back to the hollow space of the rotor is aided by the rotor movement, as shown by directional arrow A on FIG. 2 of the drawing.

This is not unconditionally necessary when the partition 23 is built into the duct 20, even if also in this case the movement of the condensate is aided.

The supply pipe 21 projects some way into the hollow space of the rotor so that its inner end will always be above the condensate level in the rotor space, said level being controlled by the siphon pipe 18.

In the embodiment as shown in FIGS. 4–6, each of the ribs 19 consists of a plane sheet to which has been welded the helically cut, and to an arcuate form embossed strip 22 to form the helical duct 20. Adjacent the closed outer end of the said duct, an opening 27 leads to a radial passage 28 on the backside of the rib 19, so that the condensate may be returned through this passage to the interior of the rotor 14.

What is claimed is:

1. A heat exchanger for treating moist, tacky material, which comprises:
   a. a stationary drum, having
   b. an internal hollow shaft or rotor with inlet and outlet for the heat exchanging medium,
   c. annular bodies in the shape of ribs encircling said rotor, each of said ribs being provided with a helical, hollow space, the inner end of which communicates with the hollow shaft, the outer end being closed, each said rib formed from a plane sheet, and the helical hollow space thereof being formed by attachment to the sheet of a helically cut strip of arcuate cross-section, and means for rotating said hollow shaft and the shaft attached annular rib shaped bodies in a direction such that the closed end of the helical space is in front whereby movement of the condensate back to the hollow space of the rotor is aided by the rotor movement.

2. Heat exchanger according to claim 1, in which a helical strip of curved cross-section is mounted on each side of the plane sheet, from which the rib is made, to form two helical hollow spaces in the rib.

3. Heat exchanger according to claim 2, in which the outer ends of the helical hollow spaces overlap one another and are mutually connected through an opening in the rib sheet.

4. Heat exchanger according to claim 1, in which a helical bulb is embossed or calandered in the sheet, from which the rib is made, said bulb being covered by a helically cut, and also embossed strip to form the helical hollow space.

5. Heat exchanger according to claim 1 including a radially extending return passage, one end of said return passage connected to the outer end of the helical hollow space and the other end connected to the hollow space of the rotor.

6. A heat exchanger for treating moist, tacky material, which comprises:
   a. a stationary drum, having
   b. an internal hollow shaft or rotor with inlet and outlet for the heat exchanging medium,
   c. annular bodies in the shape of ribs encircling said rotor, each of said ribs being provided with a helical, hollow space, the inner end of which communicates with the hollow shaft, the outer end being closed, means for rotating said hollow shaft and the shaft attached annular rib shaped bodies, and a guide plate fitted into the helical hollow space of the rib, and said guide plate terminating shortly before the closed end of said hollow space.

7. A heat exchanger for treating moist, tacky material, which comprises
   a. a stationary drum, having
   b. an internal hollow shaft or rotor with inlet and outlet for the heat exchanging medium,
   c. annular bodies in the shape of ribs encircling said rotor, each of said ribs being provided with a helical, hollow space, the inner end of which communicates with the hollow shaft, the outer end being closed, and means for rotating said hollow shaft and the shaft attached annular rib shaped bodies, said annular bodies being further characterized in that the distance between the turns of the helical hollow space is adjusted so that helically cut strips of width substantially corresponding to the distance between the turns of said strips can be used for forming the hollow space in a direction such that the closed end of the helical space is in front whereby movement of the condensate back to the hollow space of the rotor is aided by the rotor movement.

* * * * *